US010889305B2

(12) United States Patent
Moritzhuber

(10) Patent No.: US 10,889,305 B2
(45) Date of Patent: Jan. 12, 2021

(54) APPARATUS FOR MOVING ROPEWAY VEHICLES IN A ROPEWAY SYSTEM

(71) Applicant: INNOVA PATENT GMBH, Wolfurt (AT)

(72) Inventor: Johannes Moritzhuber, Hard (AT)

(73) Assignee: Innova Patent GmbH, Wolfurt (AT)

( * ) Notice: Subject to any disclaimer, the term of this patent is extended or adjusted under 35 U.S.C. 154(b) by 260 days.

(21) Appl. No.: 15/999,724

(22) PCT Filed: Nov. 17, 2016

(86) PCT No.: PCT/EP2016/078073
§ 371 (c)(1),
(2) Date: Aug. 20, 2018

(87) PCT Pub. No.: WO2017/140389
PCT Pub. Date: Aug. 24, 2017

(65) Prior Publication Data
US 2019/0176849 A1 Jun. 13, 2019

(30) Foreign Application Priority Data
Feb. 18, 2016 (AT) .................................... A 85/2016

(51) Int. Cl.
*B61B 12/02* (2006.01)
*F16H 1/16* (2006.01)
(Continued)

(52) U.S. Cl.
CPC .......... *B61B 12/022* (2013.01); *B61B 12/105* (2013.01); *B66C 11/20* (2013.01);
(Continued)

(58) Field of Classification Search
CPC .... B61B 7/00; B61B 7/02; B61B 7/04; B61B 7/06; B61B 9/00; B61B 10/00;
(Continued)

(56) References Cited

U.S. PATENT DOCUMENTS 3,323,777 A 6/1967 McMullen
4,878,797 A * 11/1989 Lonardi .................... C21B 7/18
414/161
(Continued)

FOREIGN PATENT DOCUMENTS

CN 88101374 A 10/1988
CN 202390172 U 8/2012
(Continued)

*Primary Examiner* — Robert J McCarry, Jr.
(74) *Attorney, Agent, or Firm* — Laurence A. Greenberg; Werner H. Stemer; Ralph E. Locher

(57) ABSTRACT

An apparatus for moving ropeway vehicles in a ropeway system includes at least one conveying wheel being adjustable in height relative to the vehicles by a lifting device to be brought into abutment against the vehicles for displacing the vehicles along a track using the conveying wheel. An electric lifting device has an electric drive motor with a threaded sleeve or the like to be retained in its height position and rotated by the drive motor and a lifting spindle to be adjusted in height by the threaded sleeve for adjusting the conveying wheel in height. Upper and lower end surfaces of the threaded sleeve and the lifting spindle have stops located approximately in planes normal to the direction of rotation of the threaded sleeve or the like which, in upper and lower end positions of the lifting spindle, abut one another preventing further rotation of the threaded sleeve.

8 Claims, 3 Drawing Sheets

(51) Int. Cl.
*B61B 12/10* (2006.01)
*B66C 11/20* (2006.01)
*B66D 1/14* (2006.01)
*F16H 55/22* (2006.01)
*F16H 55/50* (2006.01)

(52) U.S. Cl.
CPC ............... *F16H 1/16* (2013.01); *B66D 1/14* (2013.01); *F16H 55/22* (2013.01); *F16H 55/50* (2013.01)

(58) Field of Classification Search
CPC ..... B61B 10/02; B61B 10/022; B61B 10/025; B61B 11/00; B61B 11/002; B61B 11/004; B61B 11/006; B61B 12/00; B61B 12/02; B61B 12/12; B61B 12/122
See application file for complete search history.

(56) References Cited

U.S. PATENT DOCUMENTS

| | | | | |
|---|---|---|---|---|
| 2008/0148989 | A1* | 6/2008 | Moritzhuber | ......... B61B 12/022 |
| | | | | 104/173.1 |
| 2010/0212843 | A1* | 8/2010 | Bohlen | .................... E06B 9/88 |
| | | | | 160/168.1 R |

FOREIGN PATENT DOCUMENTS

| | | |
|---|---|---|
| CN | 103863976 A | 6/2014 |
| CN | 204138312 U | 2/2015 |
| DE | 1258573 B | 1/1968 |
| EP | 0774392 A1 | 5/1997 |
| EP | 1024069 A2 | 8/2000 |
| EP | 1997706 A1 | 12/2008 |
| KR | 960007359 A | 3/1996 |
| KR | 1020010111960 A | 12/2001 |
| RU | 2421355 C2 | 6/2011 |

* cited by examiner

APPARATUS FOR MOVING ROPEWAY VEHICLES IN A ROPEWAY SYSTEM

BACKGROUND OF THE INVENTION

Field of the Invention

The present invention relates to an apparatus for moving ropeway vehicles in a ropeway system with at least one conveying wheel, the height of which relative to the ropeway vehicles may be adjusted by means of a lifting device to bring them into abutment, so that the ropeway vehicles may be moved along a track by means of the at least one conveying wheel.

Ropeway systems with storage facilities in which the ropeway vehicles may be stored, this storage being carried out in particular outside of operating hours, are known in the art. These are known as ropeway vehicle garages, to which the ropeway vehicles travel on storage rails and are arranged close to one another, for example after operation of the ropeway system has ended. To be able to store the vehicles in this way, the conveying wheels assigned to the storage rails must be adjustable in the vertical direction.

In the lower end position, the conveying wheels abut drive surfaces furnished on the ropeway vehicles, and in this way the ropeway vehicles may be moved along the storage rails by means of the conveying wheels. In the upper end position, the conveying wheels are separated from the drive surfaces of the ropeway vehicles, so that the conveying wheels cannot move the ropeway vehicles.

On this point, reference is made for example to EP 774392 A1, in which the design and manner of operation of such a storage facility is explained.

In such storage facilities known in the art, the height of the conveying wheels is adjusted using a lifting device that is driven hydraulically or pneumatically. However, such lifting devices do not meet the technical requirements placed on them, because they require significant maintenance costs.

To avoid this drawback, an electric lifting device may be furnished, having an electric motor and a height-adjustable lifting spindle. But in such a lifting device, it must be ensured that upon reaching the upper or lower end position of the lifting spindle, movement is stopped without locking or wedging the surfaces that come to abut one another, because otherwise the lifting spindle will be difficult to re-adjust.

SUMMARY OF THE INVENTION

The present invention accordingly has the objective of providing an electric lifting device wherein, at the end positions of the lifting spindle, the parts that come to abut one another are not locked or wedged together. This is achieved according to the invention by furnishing an electric lifting device, equipped with an electric drive motor, a threaded sleeve or the like that may be rotated by the motor and held at the height thereof, and a lifting spindle, the height of which may be adjusted by the threaded sleeve, by means of which the at least one conveying wheel may be adjusted in height; wherein the threaded sleeve and lifting spindle on the upper and lower end faces that are oriented to one another in their operating position have stops that are at least approximately in normal planes on the direction of rotation of the threaded sleeve or the like, which come into abutment in the upper and lower end positions of the lifting spindle, so as to prevent further rotation of the threaded sleeve.

Preferably, the lifting spindle is formed with two separated stop discs furnished with profiles, and between these stop discs the spindle is designed with an outer thread by means of which the spindle is guided in a threaded bore of the threaded sleeve, and the threaded sleeve has profiles that match the profiles of the stop discs. In this case, the threaded sleeve may be designed with axial extensions, which are formed with profiles. Preferably, the opposite end faces of the stop discs and the extensions of the threaded sleeve are designed with radially extending profiles which are provided with stop surfaces in planes that are at least approximately normal to the direction of rotation of the threaded sleeve. It is also preferable that the lifting spindle is designed with a locking bolt, polygonal in cross section, which is guided in a counter-profiled aperture of a locking plate, so that the lifting spindle is secured against rotation. In addition, the threaded sleeve is preferably formed as a worm wheel, which interacts with a drive spindle of the drive motor.

It is also preferable that the electrical winding of the drive motor is formed with a thermal contact located in the feed line of the drive motor, which is opened when a thermal limit value is exceeded in the drive motor, and as a result the drive motor is then switched off.

BRIEF DESCRIPTION OF THE SEVERAL VIEWS OF THE DRAWING

A lifting device according to the invention is explained below, with reference to an exemplary embodiment shown in the drawings. The drawings show the following.

DESCRIPTION OF THE INVENTION

Figure 1:
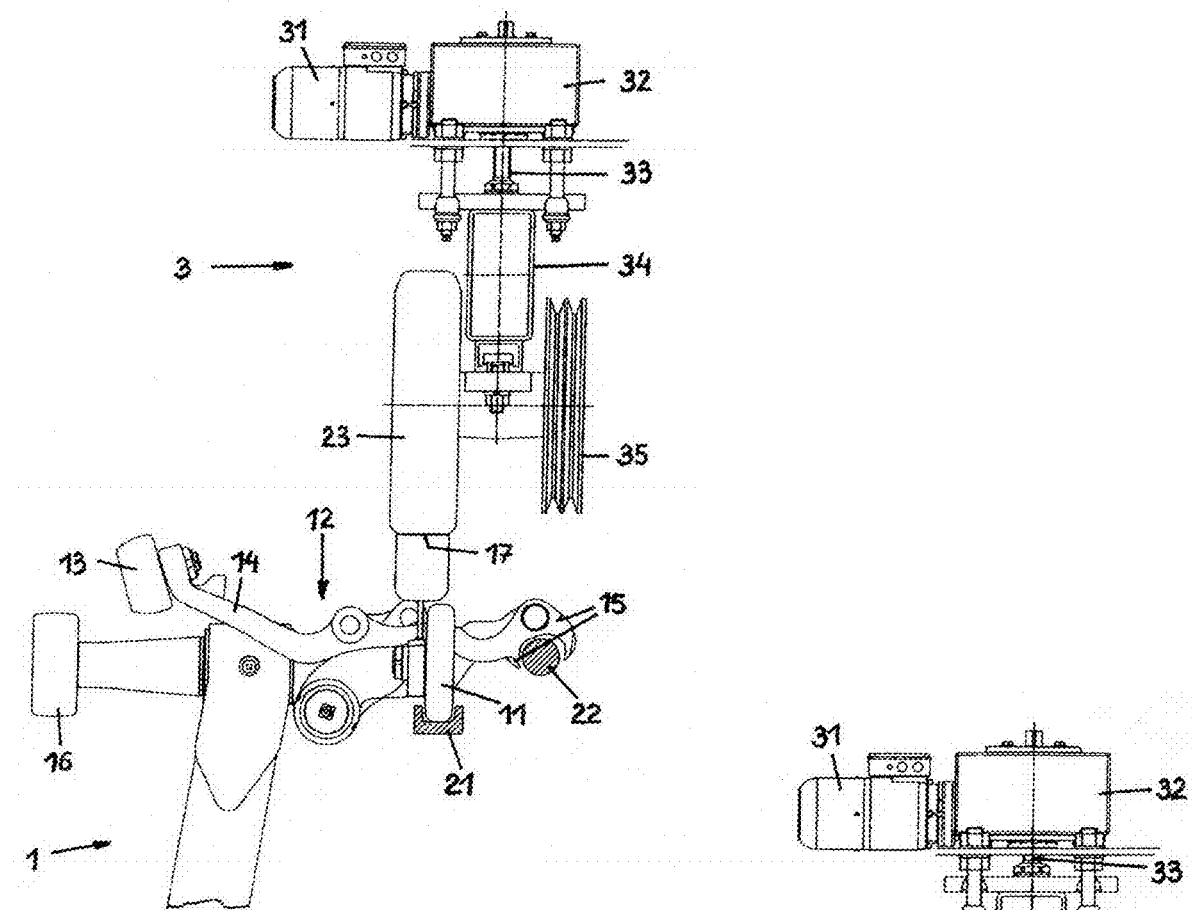
FIG. 1: side view of an electric lifting device according to the invention, with the lifting spindle in its lower end position.
Figure 1A:
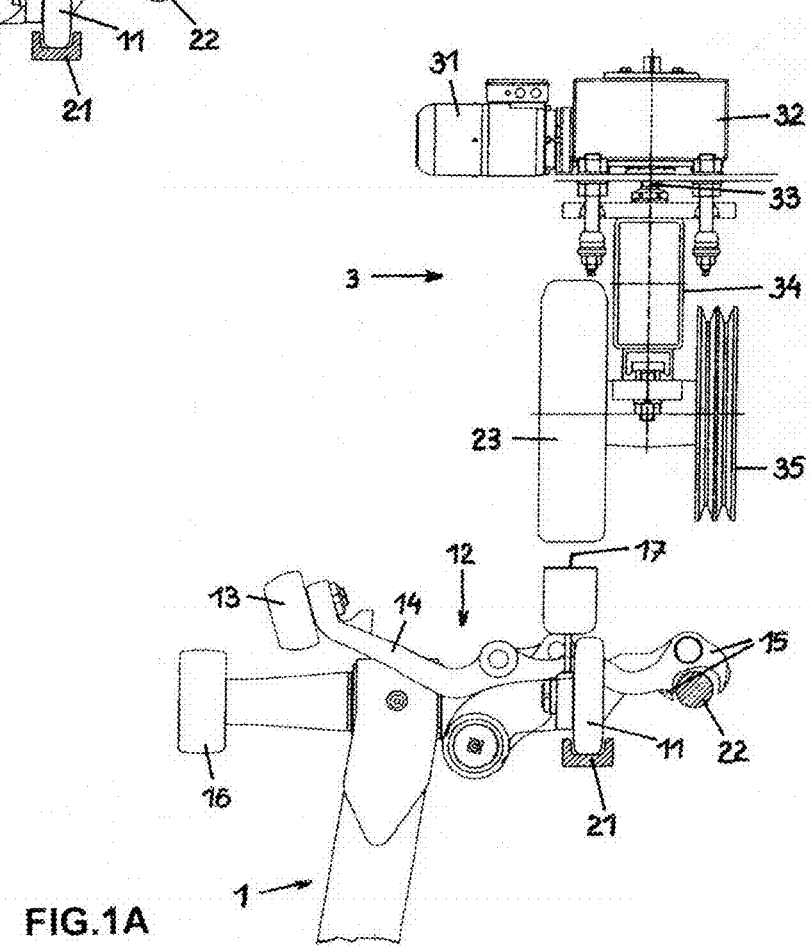
FIG. 1A: side view of the electric lifting device, with the lifting spindle in its upper end position.

In FIGS. 1 and 1A, the upper components of a ropeway vehicle 1 are shown. These components are a drive with at least one roller 11 that may be moved along a guide rail 21, and a clamping device 12 by means of which the ropeway vehicle 1 may be clamped to a conveyor cable 22. The clamping device 12 is designed with an adjusting roller 13, an adjusting lever 14 with clamping jaws 15, and a support roller 16. The ropeway vehicle 1 is designed with a drive surface 17 which height-adjustable conveying wheels 23 may abut in order to bring the ropeway vehicles 1 through a ropeway station or start them in motion in a garage.

For this purpose, a lifting device 3 is furnished, by means of which the conveying wheels 23 may be adjusted to either the lower end position shown in FIG. 1, in which they rest against the drive surface 17, or the upper end position shown in FIG. 1A, in which they are lifted away from the drive surface 17.

The lifting device 3 has an electric drive motor 31, by means of which an adjusting rod 33 may be adjusted in height by means of a gear located in a housing 32. The adjusting rod 33 is rigidly connected to a support beam 34, on which a group of conveying wheels 23 are stored, as well as pulleys 35 by means of which the conveying wheels 23 may be rotated using belt gears.

In FIG. 1, the conveying wheels 23 are moved to their lower end position by means of the lifting device 3, and as a result come up against the drive surfaces 17, so that the ropeway vehicles 1 may be moved along a track in the form of the guide rail 21. In contrast, in FIG. 1A the conveying wheels 23 are in their upper end position, and as a result are lifted away from the drive surfaces 17, so that the ropeway vehicles 1 cannot be moved.

Figure 2:
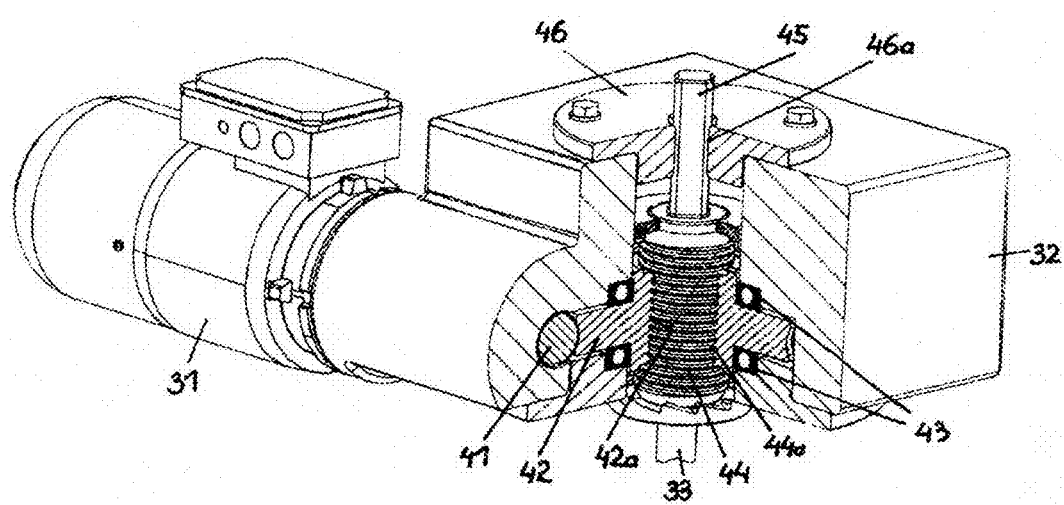
FIG. 2: axonometric representation of the drive of the lifting device.

Below, the drive of the lifting device 3 will be explained with reference to FIG. 2: This drive comprises the electric drive motor 31 by means of which a drive spindle 41 may be rotated. In the housing 32, there is a threaded sleeve in the form of a worm wheel 42, which is mounted between two bearings 43 located in the housing 32, which when in operating position are vertically separated from each other. By means of the drive spindle 41, which meshes with the worm wheel 42, the worm wheel is rotated about an at least approximately vertical axis. The worm wheel 42 is designed with a central threaded bore 42a, in which a lifting spindle 44 is guided, and which has an outer thread 44a.

At its upper end, the lifting spindle 44 is designed with a locking bolt 45, polygonal in cross section, which passes through a likewise polygonal aperture 46a in a locking plate 46 mounted on the housing 32, and as a result the lifting spindle 44 is secured against rotation.

By rotation of the worm wheel 42, the lifting spindle 44 is adjusted in the vertical direction. When adjusting the lifting spindle 44 inside the worm wheel 42 in the vertical direction, it must be ensured that as soon as the lifting spindle 44 enters the upper or lower end position, the drive is stopped to prevent the opposite surfaces of the worm wheel 42 and lifting spindle 44 from locking or wedging together.

Figure 3:
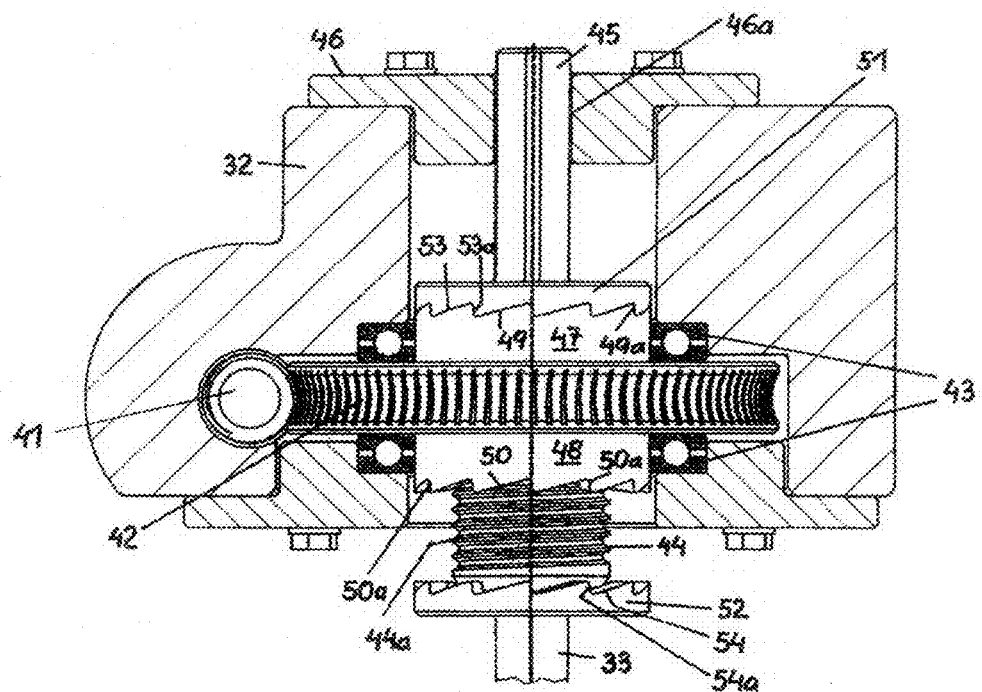
FIG. 3: side view and partial section of the drive of the lifting device, with the lifting spindle in its lower end position.
Figure 3A:
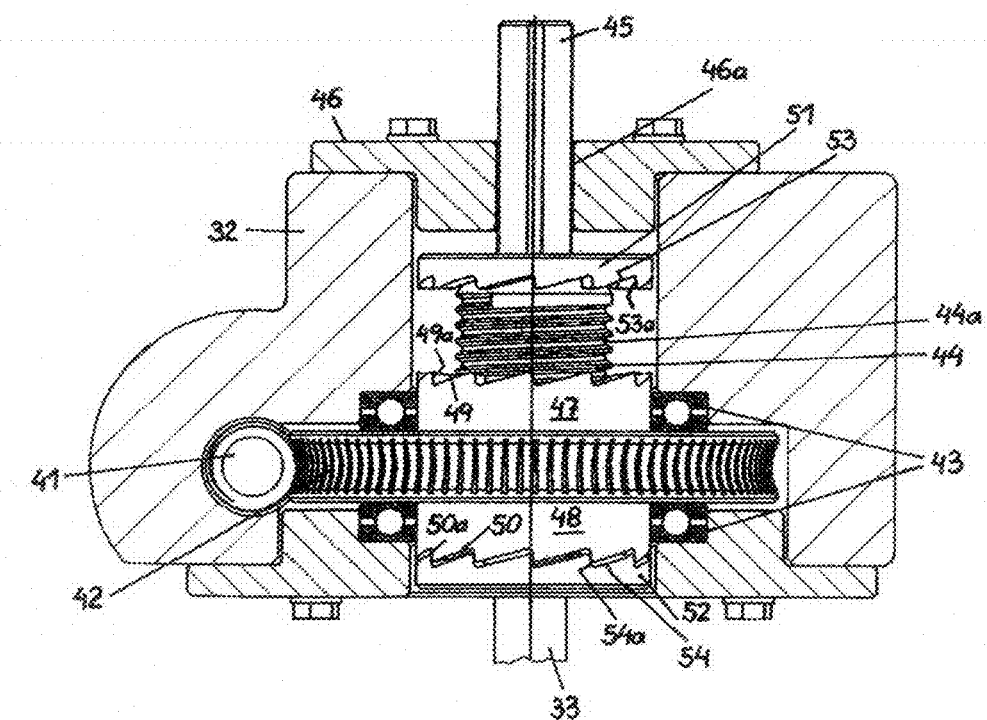
FIG. 3A: side view and partial section of the drive of the lifting device, wherein the lifting spindle is in its upper end position.

As may be seen from FIGS. 3 and 3A, in the housing 32 are located the bearings 43 for the worm wheel 42, which is may be rotated by the drive spindle 41 around an at least approximately vertical axis. In the threaded bore 42a of the worm wheel 42, the lifting spindle 44 is guided, and is adjusted up or down by a rotation of the worm wheel 42.

In FIG. 3, the lower end position of the lifting spindle 44 is shown and in FIG. 3A, the upper end position of the lifting spindle 44 is shown. Here, the conveying wheels 23 are adjusted to the end positions shown in the FIGS. 1 and 1A.

The worm wheel 42 is designed with axial extensions 47 and 48, which are formed on the upper or lower end face with rib-like profiles 49 and 50 that extend at least approximately radially, through which stop surfaces 49a and 50a are formed, which are in normal planes in the direction of rotation of the worm wheel 42. The lifting spindle 44 is formed in the region of the worm wheel 42 with an upper stop disc 51 and lower stop disc 52, and these two stop discs 51 and 52 are furnished, at their end faces associated with the axial extensions 47 and 48, with rib-like profiles 53 and 54 that extend at least approximately radially, which are formed with stop surfaces 53a and 54a, which are also in normal planes in the direction of rotation of the worm wheel 42.

In adjusting the lifting spindle 44 to one of its two end positions, the stop surfaces 53a and 54a, which are located on the stop discs 51 and 52 of the lifting spindle 44, come to abut the stop surfaces 49a and 50a of the extensions 47 and 48. As a result, further rotation of the worm wheel 42 and thus also the drive spindle 41 is prevented, and as a result the drive motor 31 is stopped. This prevents the worm wheel 42 and lifting spindle 44 from wedging together. As a result, the lifting spindle 44 may be adjusted to the other end position without any difficulty.

Because the worm wheel 42 is blocked in its rotation at the upper and lower end positions, the drive motor 31 cannot build up any pre-tension in the thread of the lifting spindle 44. The drive motor 31 is designed so that it may stop. The total lifting time of the lifting spindle 44 from the lower end position to the upper end position is designed to be about 3 seconds. Because the electrical control is configured so that the power supply is interrupted after 5 seconds, the drive motor 31 cannot become thermally overloaded. For additional safety, the electrical winding of the drive motor 31 is designed with a thermal contact located in the feed line of the drive motor 31, which is opened when a thermal limit value is exceeded in the drive motor 31, and as a result the drive motor 31 is also switched off.

In this exemplary embodiment, the drive spindle 41 of the electric motor 31 and the lifting spindle 44 are at right angles to each other, and are coupled together by means of an angular gear. However, this spatial arrangement is irrelevant to the structural design according to the invention. For example, the drive spindle of the drive motor may be oriented parallel to the lifting spindle, the drive coupling taking place via a drive pinion.

The invention claimed is:

1. An apparatus for moving ropeway vehicles in a ropeway system, the apparatus comprising:
    at least one conveying wheel; and
    an electric lifting device for adjusting a height of said at least one conveying wheel relative to the ropeway vehicles to bring said at least one conveying wheel into abutment against the vehicles for moving the vehicles along a track using said at least one conveying wheel;
    said electric lifting device including an electric drive motor, a threaded sleeve to be rotated by said electric drive motor and held at a height, and a lifting spindle having upper and the lower end positions and a height to be adjusted by said threaded sleeve for adjusting the height of said at least one conveying wheel;
    said threaded sleeve and said lifting spindle including upper and lower end faces being oriented toward one another and having stops disposed at least approximately in normal planes in a direction of rotation of said threaded sleeve, said stops coming into abutment in said upper and the lower end positions of said lifting spindle for preventing further rotation of said threaded sleeve.

2. The apparatus according to claim 1, wherein:
    said lifting spindle includes two mutually spaced apart stop discs having profiles;
    said lifting spindle includes an outer thread disposed between said stop discs for guiding said lifting spindle in a threaded bore formed in said threaded sleeve; and
    said threaded sleeve has profiles matching said profiles of said stop discs.

3. The apparatus according to claim 2, wherein said threaded sleeve includes axial extensions having said profiles.

4. The apparatus according to claim 3, wherein said stop discs and said axial extensions have mutually facing end faces, said profiles extend radially on said end faces, and said profiles have stop surfaces in planes being at least approximately normal to the direction of rotation of said threaded sleeve.

5. The apparatus according to claim 1, which further comprises a locking plate, said lifting spindle including a locking bolt having a polygonal cross section and being guided in a counter-profiled aperture formed in said locking plate.

6. The apparatus according to claim 1, wherein said drive motor has a drive spindle, and said threaded sleeve is a worm wheel interacting with said drive spindle.

7. The apparatus according to claim 1, wherein said drive motor includes a feed line and an electrical winding having a thermal contact located in said feed line, said thermal contact being opened upon exceeding a thermal limit value in said drive motor for turning off said drive motor.

8. The apparatus according to claim 1, wherein said stops each have respective stop surfaces in planes being at least approximately normal to the direction of rotation of said threaded sleeve.

* * * * *